US008218436B2

(12) United States Patent
Zhao et al.

(10) Patent No.: US 8,218,436 B2
(45) Date of Patent: Jul. 10, 2012

(54) DYNAMIC AGGREGATED MAXIMUM BIT RATE FOR EVOLVED PACKET SYSTEM NON-GUARANTEED BIT RATE QUALITY OF SERVICE ENFORCEMENT AND NETWORK BANDWIDTH UTILIZATION

(75) Inventors: Xiaoming Zhao, Plano, TX (US); Wei Wu, Coppell, TX (US); Zhijun Cai, Euless, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 167 days.

(21) Appl. No.: 12/052,902

(22) Filed: Mar. 21, 2008

(65) Prior Publication Data

US 2009/0238207 A1 Sep. 24, 2009

(51) Int. Cl.
*G01R 31/08* (2006.01)
*H04L 12/28* (2006.01)
*H04J 3/16* (2006.01)

(52) U.S. Cl. .................. 370/230; 370/235; 370/395.21; 370/468

(58) Field of Classification Search .................. 370/230, 370/235, 395.1, 395.21, 468
See application file for complete search history.

(56) References Cited

U.S. PATENT DOCUMENTS

| | | | |
|---|---|---|---|
| 4,646,300 A | 2/1987 | Goodman et al. | |
| 5,450,483 A | 9/1995 | Williams | |
| 5,991,268 A | 11/1999 | Awdeh et al. | |
| 6,504,818 B1 | 1/2003 | Levine | |
| 6,657,987 B1 | 12/2003 | Kumar et al. | |
| 6,909,692 B1 | 6/2005 | Sharma | |
| 6,934,752 B1* | 8/2005 | Gubbi | 709/225 |
| 7,283,471 B2 | 10/2007 | Gutierrez et al. | |
| 7,346,045 B2 | 3/2008 | Montes Linares | |
| 8,064,382 B2 | 11/2011 | Zisimopoulos et al. | |
| 2002/0110084 A1 | 8/2002 | Butt et al. | |
| 2002/0136163 A1 | 9/2002 | Kawakami et al. | |
| 2004/0042476 A1 | 3/2004 | Peacock | |
| 2006/0092837 A1* | 5/2006 | Kwan et al. | 370/229 |
| 2007/0081454 A1 | 4/2007 | Bergamasco et al. | |
| 2008/0037552 A1* | 2/2008 | Dos Remedios et al. | 370/395.21 |
| 2008/0049787 A1* | 2/2008 | McNaughton et al. | 370/468 |
| 2010/0118781 A1 | 5/2010 | Petrovic et al. | |

(Continued)

FOREIGN PATENT DOCUMENTS

EP 1187399 A1 3/2002

(Continued)

OTHER PUBLICATIONS

3GPP TS 23.401, Technical Specification, V8.0.0 (Dec. 2007) (available at http://www.3gpp.org/ftp/Specs/html-info/23401.htm, indicated as entry SP-38, Freeze Date 8.0.0, Dec. 13, 2007).*

(Continued)

*Primary Examiner* — Brandon Renner
(74) *Attorney, Agent, or Firm* — Conley Rose, P.C.; J. Robert Brown, Jr.

(57) ABSTRACT

A system is provided for specifying a dynamic aggregated maximum bit rate (AMBR). The system includes a processor configured to determine whether a change in the AMBR currently applicable to a first network component should be requested. If a change in the AMBR is requested, the processor is configured to promote the first network component recommending to a second network component an adjusted AMBR.

19 Claims, 7 Drawing Sheets

U.S. PATENT DOCUMENTS

2010/0135229 A1    6/2010    Lohr et al.
2011/0002306 A1    1/2011    Liu

FOREIGN PATENT DOCUMENTS

WO          2007130281 A2    11/2007

OTHER PUBLICATIONS

3GPP TSG SA WG2 Meeting #63; Title: "AMBR per UE"; S2-081100; Feb. 18-22, 2008; Athens, Greece, 12 pgs.

3GPP TSG-SA WG2 Meeting #62; Title: "AMBR Modification Procedure"; S2-080360; Jan. 14-18, 2008; Marina Del Rey; 12 pgs.

3GPP TSG SA WG2 Architecture—S2#59; Title: "Handling of AMBR in the Multiple PDN Connection Scenario"; S2-073435; Aug. 27-31, 2007; Helsinki, Finland; 7 pgs.

EP Extended Search and Examination Report; EP Application No. 08153736.7; Jul. 4, 2008; 8 pgs.

Zhao, Xiaoming, et al.; U.S. Appl. No. 12/394,973, filed Feb. 27, 2009; Title: Proactive Uplink Aggregate Maximum Bit RAte Enforcement.

Research in Motion Limited; EP Extended Search and Examination Report; EP Application No. 09155932.8; Aug. 10, 2009; 10 pgs.

Research in Motion Limited; EP Second Examination Report; EP Application No. 08153736.7; Jul. 8, 2009; 4 pgs.

Nokia Siemens Networks, Nokia; 3GPP TSG SA WG2 Meeting #63; Title: Solutions for AMBR per UE; TD S2-081514; Athens, Greece; Feb. 18-22, 2008; 2 pgs.

Vodafone; 3GPP SA 2 Meeting #63; Title: MME Overload Handling; Change Request; S2-081797; Athens, Greece; Feb. 18-22, 2008; 4 pgs.

3GPP TS 23.401v1.2.1; 3rd Generation Partnership Project; Technical Specification Group Services and System Aspects; GPRS Enhancements for E-UTRAN Access; Release 8; Sep. 2007; 87 pgs.

3GPP TS 23.401v8.0.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Dec. 2007; Part 1; 99 pgs.

3GPP TS 23.401v8.0.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Dec. 2007; Part 2; 68 pgs.

European Search and Examination Report; European Patent Application No. 10184047.8; Mar. 15, 2011; 9 pgs.

Ericsson, Alcatel-Lucent, AT&T, Qualcomm Europe, Motorola; 3GPP TSG SA WG2 Meeting #63; Title: AMBR per UE; Change Request; S2-081100; Athens, Greece; Feb. 18-22, 2008; 14 pgs.

IPWireless, Nextwave; 3GPP TSG SA WG2 Architecture-S2#59; Title: Handling of AMBR in the Multiple PDN Connection Scenario; S2-073435; Helsinki, Finland; Aug. 27-31, 2007; 7 pgs.

Samsung; 3GPP TSG-SA WG2 Meeting #62; Title: AMBR Modification Procedure; Change Request; S2-080360; Marina Del Rey, US; Jan. 14-18, 2008; 12 pgs.

Office Action dated Nov. 4, 2010; 13 pages; U.S. Appl. No. 121394,973, filed Feb. 27, 2009.

EP Third Examination Report; EP Application No. 08153736.7; Nov. 30, 2009; 4 pgs.

EP Decision to Grant; EP Application No. 08153736.7; Sep. 9, 2010; 1 pg.

Final Office Action dated Apr. 8, 2011; 16 pages; U.S. Appl. No. 12/394,973, filed Feb. 27, 2009.

Interview Summary dated Jun. 3, 2011; 3 pages; U.S. Appl. No. 12/394,973, filed Feb. 27, 2009.

Office Action dated Oct. 19, 2011; 16 pages; U.S. Appl. No. 12/394,973, filed Feb. 27, 2009.

European Extended Search Report; Application No. 11174363.9; Sep. 13, 2011; 9 pages.

Canadian Office Action; CA Application No. 2,658,540; Jul. 26, 2011; 4 pgs.

Canadian Office Action; CA Application No. 2,659,866; Jul. 22, 2011; 3 pgs.

Office Action dated Mar. 16, 2012; 12 pages; U.S. Appl. No. 12/394,973, filed Feb. 27, 2009.

\* cited by examiner

DYNAMIC AGGREGATED MAXIMUM BIT RATE FOR EVOLVED PACKET SYSTEM NON-GUARANTEED BIT RATE QUALITY OF SERVICE ENFORCEMENT AND NETWORK BANDWIDTH UTILIZATION

BACKGROUND

Easily transportable devices with wireless telecommunications capabilities, such as mobile telephones, personal digital assistants, handheld computers, and similar devices, will be referred to herein as user equipment (UE). The term "UE" may refer to a device and its associated Universal Integrated Circuit Card (UICC) that includes a Subscriber Identity Module (SIM) application, a Universal Subscriber Identity Module (USIM) application, or a Removable User Identity Module (R-UIM) application or may refer to the device itself without such a card. The term "UE" may also refer to devices that have similar capabilities but that are not transportable, such as a desktop computer or a set-top box. A connection between a UE and some other element in a telecommunications network might promote a voice call, a file transfer, or some other type of data exchange, any of which can be referred to as a call or a session.

Some UEs communicate in a circuit switched mode, wherein a dedicated communication path exists between two devices. For the duration of a call or session, all data exchanged between the two devices travels along the single path. Some UEs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers.

Communications that take place via circuit switching can be said to occur in the circuit switched domain and communications that take place via packet switching can be said to occur in the packet switched domain. Within each domain, several different types of networks, protocols, or technologies can be used. In some cases, the same network, protocol, or technology can be used in both domains. The wireless communication networks may be based on Code Division Multiple Access (CDMA), Time Division Multiple Access (TDMA), Frequency Division Multiple Access (FDMA), Orthogonal Frequency Division Multiplexing (OFDM), or some other multiple access scheme. A CDMA-based network may implement one or more standards such as 3GPP2 IS-2000 (commonly referred to as CDMA 1x), 3GPP2 IS-856 (commonly referred to as CDMA 1xEV-DO), or 3GPP UMTS (Universal Mobile Telecommunications System). The modes of access for UMTS are referred to as Universal Terrestrial Radio Access (UTRA). A TDMA-based network may implement one or more standards such as 3GPP Global System for Mobile Communications (GSM) or 3GPP General Packet Radio Service (GPRS).

GSM is an example of a wireless network standard that uses only the circuit switching mode. Examples of wireless network standards that use only packet switching include GPRS, CDMA 1x EV-DO, Worldwide Interoperability for Microwave Access (WiMax), and Wireless Local Area Network (WLAN), which might comply with Institute of Electrical and Electronics Engineers (IEEE) standards such as 802.16, 802.16e, 802.11a, 802.11b, 802.11g, 802.11n, and similar standards. Examples of wireless network standards that may use both circuit switching and packet switching modes include CDMA 1x and UMTS. The IP (Internet Protocol) Multimedia Subsystem (IMS) is a packet switched technology that allows multimedia content to be transmitted between UEs.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to one embodiment, a method is provided for dynamically adjusting an aggregated maximum bit rate (AMBR). The method includes determining whether a change in the AMBR currently applicable to a first network component should be requested. If a change in the AMBR is requested, the first network component recommending to a second network component an adjusted AMBR.

Figure 1:
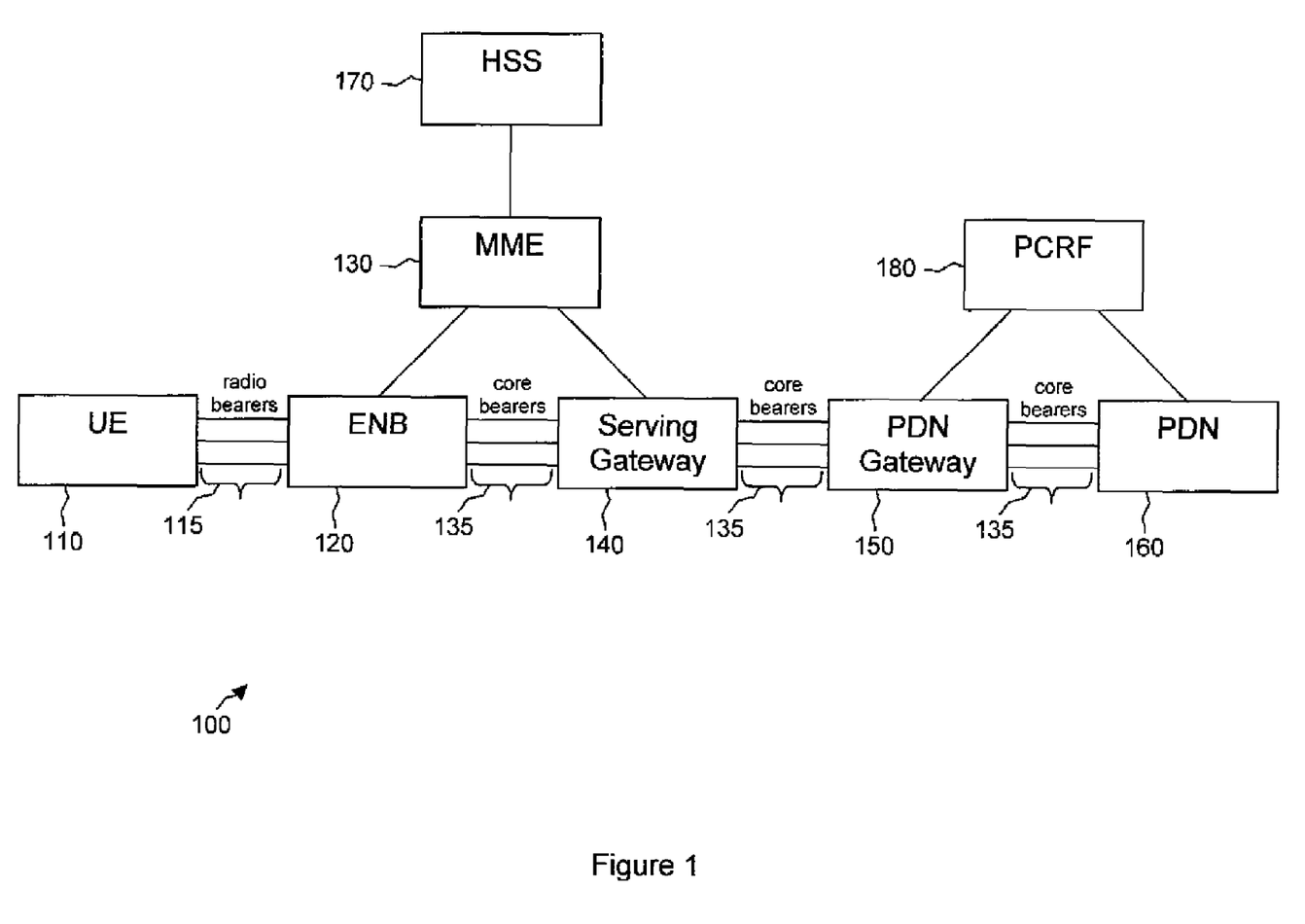
FIG. 1 is an illustration of a wireless telecommunications system according to an embodiment of the disclosure.

In another embodiment, a system is provided for specifying a dynamic aggregated maximum bit rate (AMBR). The system includes a processor configured to determine whether a change in the AMBR currently applicable to a first network component should be requested. If a change in the AMBR is requested, the processor is configured to promote the first network component recommending to a second network component an adjusted AMBR FIG. 1 illustrates an exemplary wireless telecommunications system 100 according to an embodiment of the disclosure. It should be noted that some of the lines connecting the components in FIG. 1 might represent bearer connections and some of the lines might represent signaling connections. Traditionally, different styles of lines are used to represent the different types of connections. However, for the sake of clarity in the drawing, the different types of connections in FIG. 1 are represented by the same style of line. Also, other connections that are not shown might exist between the components in FIG. 1.

The system 100 includes a UE 110 that can connect to a packet data network (PDN) 160. Although only one UE 110 and one PDN 160 are shown, a plurality of UEs 110 could be present, each of which could connect to a plurality of PDNs 160. The PDN 160 might be an Internet-based network or might be another type of network that can provide packet-based data. The PDN 160 can allow access to packet-based services, such as World Wide Web pages, multimedia broadcast/multicast services, and other data packet-based services. To access the PDN 160, the UE 110 might establish one or more radio bearer connections 115 with an ENB 120, a base station, or a similar component.

In some cases, the ENB 120 may connect, via the core bearer connections 135, to a serving gateway 140, which can also be referred to as a mobile access gateway (MAG). The serving gateway 140 terminates the interface of the radio access portions of the system 100. In other cases, the ENB 120 may connect to the serving gateway 140 via the control of a mobility management entity (MME) 130.

The serving gateway 140 forwards packets to the PDN 160 via a PDN gateway 150. While a single PDN gateway 150 is shown providing access to a single PDN 160, a plurality of PDN gateways 150 might be present, each of which could provide access to a plurality of PDNs 160. The serving gateway 140, the PDN gateway 150, and the PDN 160 communicate via one or more core bearers 135. There is a one-to-one correspondence between the radio bearers 115 and the core bearers 135. That is, for each connection the UE 110 has to the PDN gateway 150, there is also a connection to the ENB 120.

A home subscriber server (HSS) 170, or a similar component, can connect to the MME 130 and can store data related to services available to the UE 110, billing policies for the UE 110, and similar UE profile data. If dynamic policy and charge control (PCC) rules are to be deployed in the system 100, a policy control and charging rules function (PCRF) 180, or a similar component, might be present. The PCRF 180 can connect to the serving gateway 140, the PDN gateway 150, and/or the PDN 160 for an operators IP services, and can store and enforce policies related to the connections between the serving gateway 140 and the PDN gateway 150.

The UE 110 might connect to a plurality of PDN gateways 150 concurrently via the ENB 120, the serving gateway 140, and a plurality of radio bearer connections 115 and core bearer connections 135. This could provide the UE 110 with fast access to multiple PDNs 160. For example, the UE 110 might use a first radio bearer 115 and first core bearer 135 to connect to a first PDN 160 in order to access the World Wide Web and use a second radio bearer 115 and second core bearer 135 to connect to a second PDN 160 in order to access a video download. The use of such concurrent bearers could allow the user to quickly switch between the two PDNs 160. Based on the UEs' quality of service (QoS) profiles, the radio bearers 115 and core bearers 135 might conform to a set of quality of service requirements, such as a guaranteed bit rate, a maximum bit rate, a packet delay budget, and other parameters of data transfer quality.

Bearer traffic can be classified into two categories: Guaranteed Bit Rate (GBR) and non-Guaranteed Bit Rate (NBR). On a GBR bearer, a specified bandwidth is reserved and remains available as long as the bearer remains in place. A GBR bearer might be established for services with large bandwidth requirements, such as streaming video. Services such as email that have more flexible bandwidth requirements might use NBR bearers, for which a specified bandwidth is not reserved.

For NBR bearers, QoS can be enforced by a QoS Class Indicator (QCI), an Allocation and Retention Priority (ARP), and an Aggregated Maximum Bit Rate (AMBR). The QCI, ARP, and AMBR are typically stored in the UE's QoS profile. When the UE 110 attaches to the network, the MME 130 can retrieve these parameters from the HSS 170 and send them to the ENB 120 for downlink/uplink QoS enforcement and to the PDN gateway 150 or the PCRF 180 for downlink/uplink QoS enforcement. The AMBR can be considered a total bandwidth available to be shared among all the radio NBR bearers 115 between the UE 110 and the ENB 120 or among all core NBR bearers 135 between the UE 110 and the PDN 160. The same AMBR is used by the radio bearers 115 and the core bearers 135.

An AMBR can be defined for one UE 110 connected to one ENB 120 or one PDN 160, for one UE 110 connected to one ENB 120 or a plurality of PDNs 160, for a plurality of UEs 110 connected to one ENB 120 or one PDN 160, or for a plurality of UEs 110 connected to a plurality of ENBs 120 or a plurality of PDNs 160. A single UE 110 can utilize the total AMBR if there is only a single radio bearer 115 between the UE 110 and the ENB 120 or a single core bearer 135 between the UE 110 and the PDN 160. If the UE 110 is connected to multiple active radio bearers 115 or multiple active core bearers 135, the bearers share the AMBR. A plurality of bearers might share an AMBR equally or each might receive a different proportion of an AMBR.

The AMBR is typically a static value that provides an unchanging limit to the total bandwidth provided for NBR traffic to the ENB 120 or to the PDN 160. Since the bandwidth that is actually available at the ENB 120 or at the PDN 160 might change in real time and might be greater than or less than the bandwidth specified in the AMBR, a static AMBR may not optimally utilize the real-time bandwidth availability under NBR QoS enforcement.

In an embodiment, a dynamic AMBR mechanism allows the AMBR allocated to one or more bearers to be increased when bandwidth is available to the bearers from other sources and allows the AMBR allocated to one or more bearers to be decreased when the bearers do not need the entire bandwidth specified in the AMBR. The ENB 120, the PDN gateway 150, and/or the PCRF 180 can be provided with the capability to observe real-time bandwidth usage. The ENB 120, the PDN gateway 150, and/or the PCRF 180 can compare this usage to the AMBR currently in effect. If it is determined that there is a significant difference between the real-time usage and the AMBR, the AMBR can be dynamically adjusted to more closely match the actual usage.

For a downlink from the PDN 160 to the UE 110, if the PDN gateway 150 or the PCRF 180 observes that the AMBR can be increased or decreased based on the PDN's real-time bandwidth usage, the PDN gateway 150 can send a "change AMBR" message downstream to the ENB 120 with a recommendation for an adjusted AMBR. If the recommended AMBR is smaller than the AMBR currently being used, the recommended AMBR is used for the radio bearers 115 and the core bearers 135. If the recommended AMBR is greater than the AMBR currently being used, the PDN gateway 150 (or PCRF 180) and the ENB 120 negotiate an adjusted AMBR that is acceptable for both the radio bearers 115 and the core bearers 135. Upon receiving a confirmation message about the agreed-upon AMBR from the ENB 120, the PDN gateway 150 (or PCRF 180) can use the agreed-upon AMBR for core bearer QoS enforcement.

For an uplink from the UE 110 to the PDN 160, if the ENB 120 observes that the AMBR can be increased or decreased based on the ENB's real-time bandwidth usage, the ENB 120 can send a "change AMBR" message upstream to the PDN gateway 150 (or PCRF 180) with a recommendation for an adjusted AMBR. If the recommended AMBR is smaller than the AMBR currently being used, the recommended AMBR is used for the radio bearers 115 and the core bearers 135. If the recommended AMBR is greater than the AMBR currently being used, the PDN gateway 150 (or PCRF 180) and the ENB 120 negotiate an adjusted AMBR that is acceptable for both the radio bearers 115 and the core bearers 135 and this may involve one signaling handshake. Upon receiving a confirmation message about the agreed-upon AMBR from the PDN gateway 150 (or PCRF 180), the ENB 120 can use the agreed-upon AMBR for radio bearer QoS enforcement.

If the term "ENB_AMBR" is used to denote the AMBR for the ENB 120, and the term "PDN_AMBR" is used to denote the AMBR for the PDN gateway 150, the negotiation rules for dynamic AMBR determination can be summarized by, but are not limited to, the following:

When the PDN gateway 150 (or the PCRF 180) receives a recommendation for an adjusted ENB_AMBR from the ENB 120:
If ENB_AMBR>PDN_AMBR, the PDN gateway 150 (or the PCRF 180) tries to increase PDN_AMBR as closely as possible to ENB_AMBR based on the PDN's real-time bandwidth utilization. The PDN gateway 150 (or the PCRF 180) uses the new PDN_AMBR and sends an AMBR change response message with the newly negotiated PDN_AMBR to the ENB 120. If ENB_AMBR<PDN_AMBR, the PDN gateway 150 (or the PCRF 180) sets PDN_AMBR=ENB_AMBR and uses the new PDN_AMBR.

When the ENB 120 receives a recommendation for an adjusted PDN_AMBR from the PDN gateway 150 (or PCRF 180):
If PDN_AMBR>ENB_AMBR, the ENB 120 tries to increase ENB_AMBR as closely as possible to PDN_AMBR based on the ENB's real-time bandwidth utilization. The ENB 120 uses the new ENB_AMBR and sends an AMBR change response message with the newly negotiated ENB_AMBR to the PDN gateway 150 (or PCRF 180).
If PDN_AMBR<ENB_AMBR, the ENB sets ENB_AMBR=PDN_AMBR and uses the new ENB_AMBR.

In an embodiment, the AMBR might be adjusted only when the difference between a recommended AMBR and a currently enforced AMBR exceeds a threshold. For example, the AMBR might be adjusted only when the recommended AMBR is 20% greater than or 20% less than the current AMBR. These thresholds can be pre-configured in the PDN gateway 150 or the ENB 120. Optionally, the thresholds can be stored in and retrieved from the HSS 170 together with the UE's static AMBR and other parameters in the UE's QoS profile.

In an embodiment, to reduce signaling overhead and other negative effects that could occur due to multiple dynamic AMBR updates, a change interval for dynamic AMBR updates can be specified. For example, the AMBR adjustments could take place only at pre-specified time intervals. Alternatively, a check might be performed only at pre-specified intervals to compare the AMBR adjustment thresholds to the real-time bandwidth utilization. Alternatively, the next AMBR to be used might be estimated at pre-specified intervals based on the current bandwidth utilization, the static AMBR, and the previous AMBRs at the ENB 120 and the PDN gateway 150 (or PCRF 180).

Figure 2:
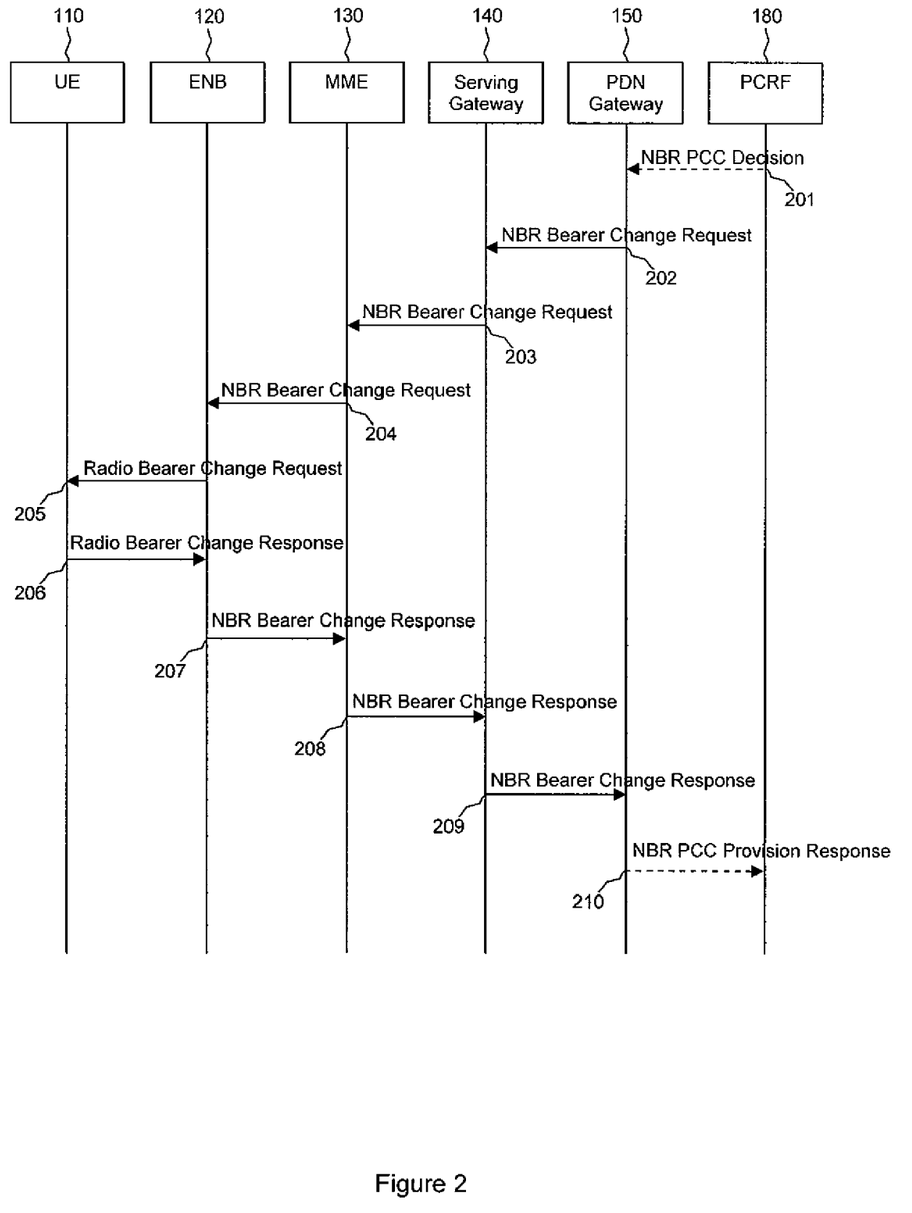
FIG. 2 is a call flow diagram for a change in a dynamic AMBR for a downlink according to an embodiment of the disclosure.

FIG. 2 illustrates an example of a downlink dynamic AMBR adjustment procedure. At event 201, a real-time AMBR change condition has been met at a periodic AMBR change interval or upon core (or EPS) bearer establishment. The change condition might be based on PDN bandwidth utilization, the AMBR change threshold, the previous AMBR, the average AMBR utilization ratio, and/or other factors. When dynamic PCC is deployed, the PCRF 180 sends an NBR PCC Decision message with the new PDN_AMBR to the PDN gateway 150. If dynamic PCC is not deployed, the PDN gateway 150, rather than the PCRF 180, may determine the new PDN_AMBR.

At event 202, if the new PDN_AMBR is less than the current PDN_AMBR, the PDN gateway 150 uses the new PDN_AMBR. If the new PDN_AMBR is greater than the current PDN_AMBR, the PDN gateway 150 waits for a response message from the ENB 120 for a negotiated ENB_AMBR. In addition, the PDN gateway 150 sends an NBR Bearer Change Request message with the recommended new PDN_AMBR and other necessary information (defined below) to the serving gateway 140.

At event 203, the serving gateway 140 sends the NBR Bearer Change Request message with the recommended new PDN_AMBR and other necessary information to the MME 130. At event 204, the MME 130 sends the NBR Bearer Change Request message with the recommended new PDN_AMBR and other necessary information to the ENB 120.

At event 205, if the current ENB_AMBR is greater than the recommended new PDN_AMBR, the ENB 120 sets the ENB_AMBR equal to the recommended new PDN_AMBR. If the current ENB_AMBR is less than the recommended new PDN_AMBR, the ENB 120 tries to increase the current ENB_AMBR as closely as possible to, but not greater than, the recommended new PDN_AMBR. Then the ENB 120 uses the new ENB_AMBR and any other QoS parameters it has received for the UE's radio bearer enforcement. If necessary, the ENB 120 then sends a Radio Bearer Change Request message with the modified radio bearer ID and other necessary information to the UE 110.

At event 206, the UE 110 acknowledges the radio bearer change to the ENB 120 with a Radio Bearer Change Response message. At event 207, the ENB 120 acknowledges the bearer change to the MME 130 with an NBR Bearer Change Response message with the newly negotiated ENB_AMBR and other necessary information. At event 208, the MME 130 acknowledges the bearer change to the serving gateway 140 by sending an NBR Bearer Change Response message with the newly negotiated ENB_AMBR and other necessary information.

At event 209, the serving gateway 140 acknowledges the bearer modification to the PDN gateway 150 by sending an NBR Bearer Change Response message with the newly negotiated ENB_AMBR and other necessary information. If, at event 202, the PDN gateway 150 was waiting for a newly negotiated ENB_AMBR, the PDN gateway 150, at event 209, sets the PDN_AMBR equal to the newly negotiated ENB_AMBR and uses the new PDN_AMBR and other QoS parameters for NBR bearer modification and QoS enforcement.

At event 210, if the change to the AMBR was triggered by an NBR PCC decision message from the PCRF 180 at event 201, the PDN gateway 150 sends an acknowledgement to the PCRF 180 regarding the new PDN_AMBR.

Figure 3:
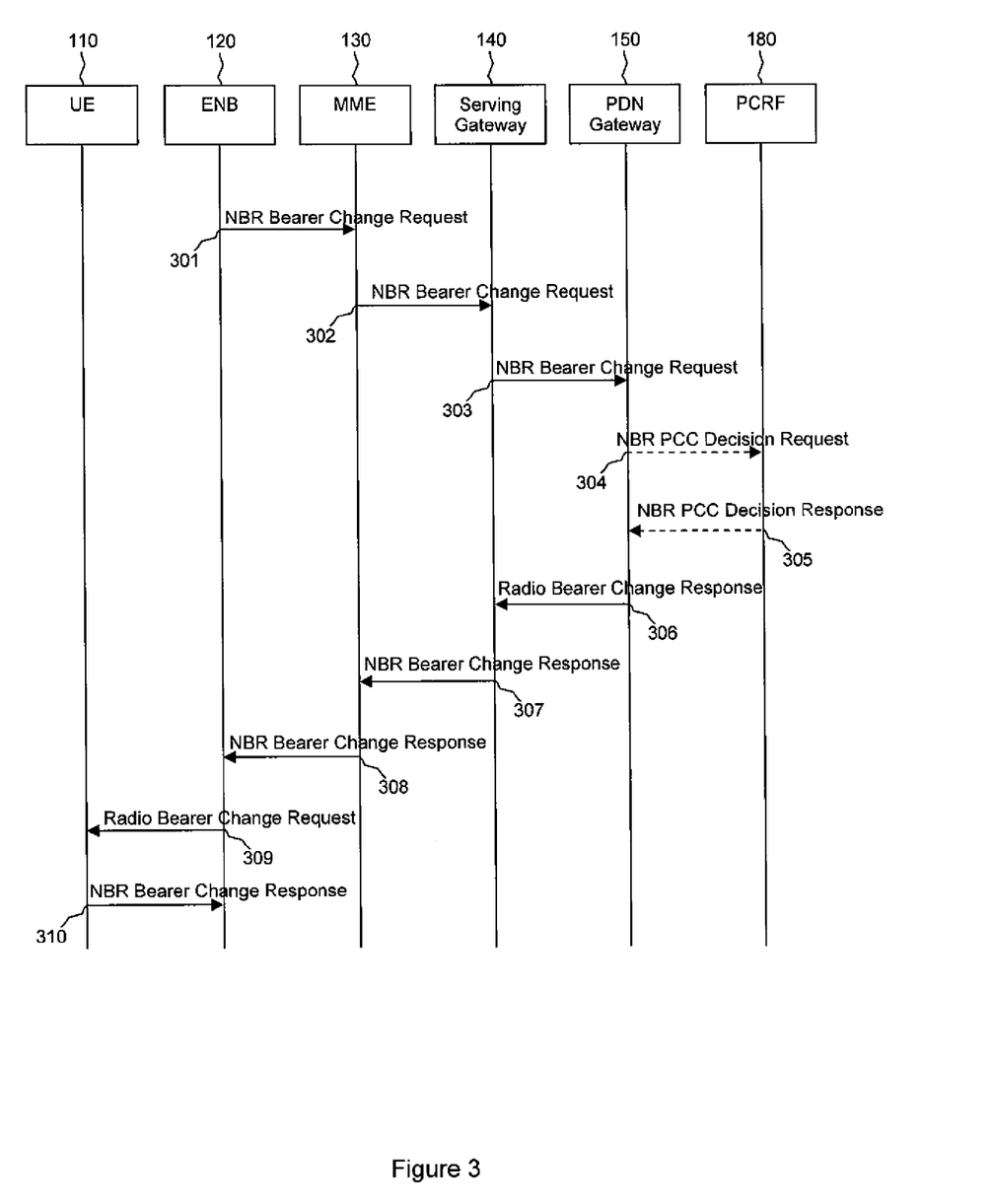
FIG. 3 is a call flow diagram for a change in a dynamic AMBR for an uplink according to an embodiment of the disclosure.

FIG. 3 illustrates an example of an uplink dynamic AMBR adjustment procedure. At event 301, a real-time AMBR change condition has been met at the ENB 120 at a periodic AMBR change interval or upon radio bearer establishment. The change condition might be based on ENB bandwidth utilization, the change thresholds, the previous AMBR for the UE, the average AMBR utilization ratio, and/or other factors. The ENB 120 determines a new ENB_AMBR and sends an NBR Bearer Change Request message with the recommended ENB_AMBR and other necessary information to the MME 130.

At event 302, the MME 130 sends the NBR Bearer Change Request Message to the serving gateway 140 with the recommended ENB_AMBR and other necessary information. At event 303, the serving gateway 140 sends the NBR Bearer Change Request Message to the PDN gateway 150 with the recommended ENB_AMBR and other necessary information.

At event 304, if the recommended ENB_AMBR is less than the current PDN_AMBR, the PDN gateway 150 sets the new PDN_AMBR equal to the recommended ENB_AMBR. If the recommended ENB_AMBR is greater than the current PDN_AMBR, the PDN gateway 150 sets the new PDN_AMBR as closely as possible to, but not greater than, the recommended ENB_AMBR based on the PDN gateway's real-time bandwidth utilization. If dynamic PCC is deployed, the PDN gateway 150 sends the new PDN_AMBR together with other QoS parameters to the PCRF 180 in an NBR PCC Decision Request message.

At event 305, if dynamic PCC is deployed, the PCRF 180 responds to the PDN gateway 150 with the determined PCC rules in an NBR PCC Decision Response message. The PDN gateway 150 then modifies the core bearers based on the newly issued PCC rules. If dynamic PCC is not deployed, the PDN gateway 150 modifies the core bearers using the new PDN_AMBR and the UE's other QoS parameters.

At event 306, the PDN gateway 150 sends an NBR Bearer Change Response message to the serving gateway 140 with the newly negotiated PDN_AMBR and other necessary information. At event 307, the serving gateway 140 sends the NBR Bearer Change Response message to the MME 130 with the newly negotiated PDN_AMBR and other necessary information. At event 308, the MME 130 sends the NBR Bearer Change Response message to the ENB 120 with the newly negotiated PDN_AMBR and other necessary information.

At event 309, the ENB 120 uses the new PDN_AMBR and other QoS parameters for radio bearer modification/establishment. If necessary, the ENB 120 then sends a Radio Bearer Change Request message with a modified radio bearer ID and other necessary information to the UE 110. At event 310, the UE 110 sends the ENB 120 an acknowledgement with a Radio Bearer Change Response message.

In the above two dynamic AMBR change procedures, the "other necessary information", in addition to the AMBR and the radio bearer ID, might include all or a portion of the following: other QoS parameters, procedure transaction ID, EPS bearer ID, traffic flow template, packet flow ID, bearer QoS session management configuration, and radio priority.

Figure 4:
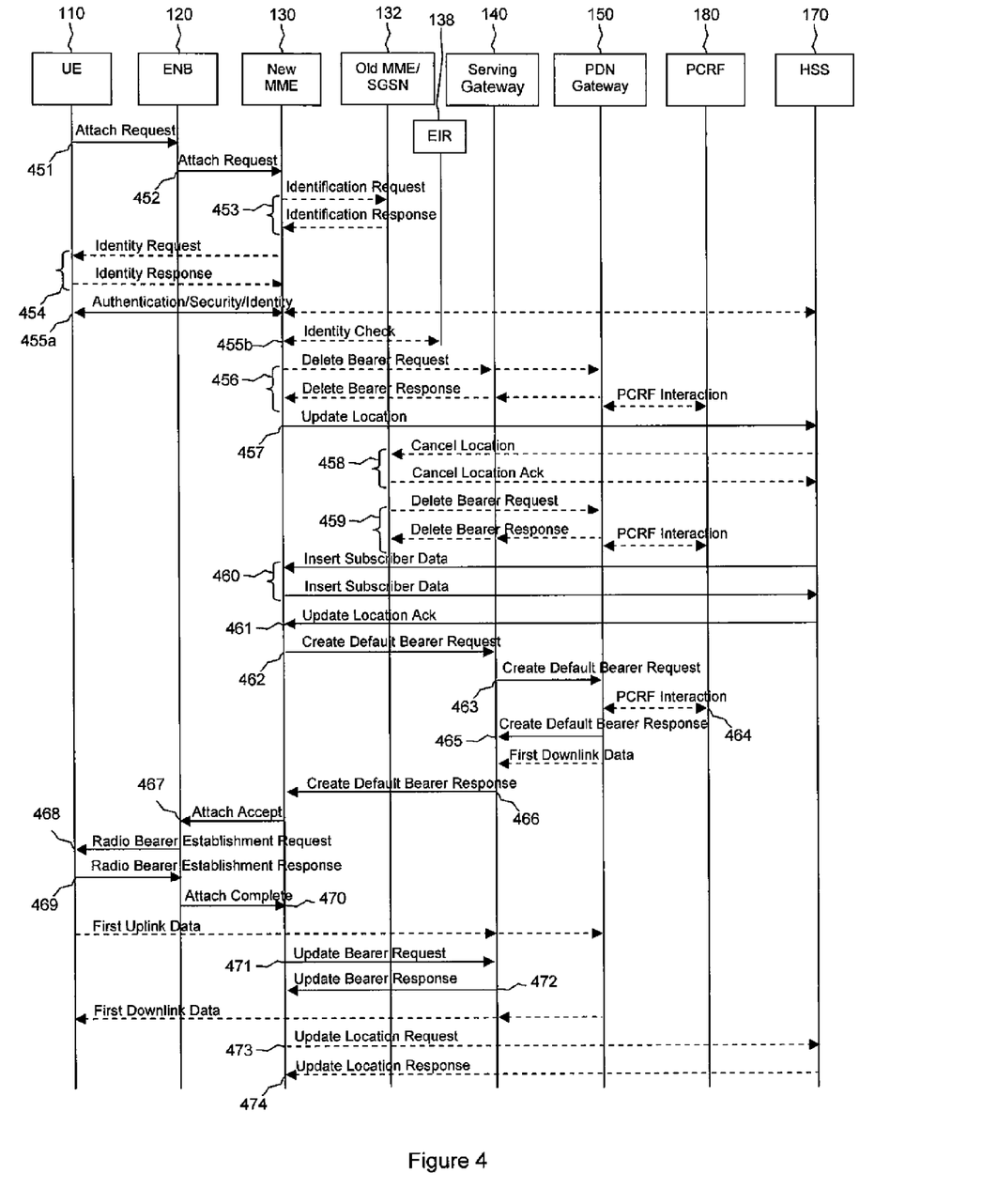
FIG. 4 is a call flow diagram for the attachment of a user equipment to a network using a dynamic AMBR according to an embodiment of the disclosure.

FIG. 4 illustrates an example of a procedure for attaching the UE 110 to an LTE network when the dynamic AMBR option is in effect. When detailed descriptions of the activities that occur at each event in the figure are not provided, it can be assumed that the activities occur in the traditional manner.

At event 451, the UE 110 initiates the attach procedure by transmitting an Attach Request message with an indication of the selected network to the ENB 120. At event 452, the ENB 120 determines the MME 130 for the selected network and forwards the Attach Request message to the MME 130.

At event 453, if the MME has changed since the UE 110 was detached, the new MME 130 sends an Identification Request to the old MME 132 to request an International Mobile Subscriber Identity (IMSI). Alternatively, the Identification Request might be sent to an old Serving GPRS Support Node (SGSN). The old MME/SGSN 132 responds with an Identification Response. If the UE 110 is not known in the old MME/SGSN 132, the old MME/SGSN 132 responds with an appropriate error cause.

At event 454, if the UE 110 is unknown in both the old MME/SGSN 132 and the new MME 130, the new MME 130 sends an Identity Request to the UE 110 to request the IMSI. The UE 110 responds with an Identity Response. If no UE context for the UE 110 exists anywhere in the network, authentication is mandatory at event 455a. Otherwise this step is optional. At event 455b, the new MME 130 may send an Identity Check request to an Equipment Identity Register (EIR) 138. The EIR 138 can respond with an Identity Check result. Dependent on the result, the new MME 130 decides whether to continue with the attach procedure or reject the UE 110.

At event 456, if there are active bearer contexts in the new MME 130 for the UE 110 (i.e. the UE 110 re-attaches to the same MME 130 without having properly detached previously), the new MME 130 deletes these bearer contexts by sending Delete Bearer Request messages to the gateways involved. The gateways acknowledge with Delete Bearer Response messages. If the PCRF 180 is deployed, the PDN gateway 150 interacts with the PCRF 180 to indicate that resources have been released.

At event 457, if the MME 130 has changed since the last detach, or if the attach is an initial attach, the new MME 130 sends an Update Location message to the HSS 170. At event 458, the HSS 170 sends a Cancel Location message to the old MME 132. The old MME 132 acknowledges with a Cancel Location Acknowledgement message and removes the bearer contexts. At event 459, if there are active bearer contexts in the old MME 132 for the UE 110, the old MME 132 deletes these bearer contexts by sending Delete Bearer Request messages to the gateways involved. The gateways return Delete Bearer Response messages to the old MME 132. If the PCRF 180 is deployed, the PDN gateway 150 interacts with the PCRF 180 to indicate that resources have been released.

At event 460, the HSS 170 sends an Insert Subscriber Data message to the new MME 130. The subscription data can contain a list of all access point names (APNs) that the UE 110 is permitted to access, an indication of which of those APNs is the default APN, and other information. If the UE 110 is not allowed to attach, the new MME 130 rejects the attach request and may return an Insert Subscriber Data acknowledgement message to the HSS 170 with an appropriate error cause. If all checks are successful, then the new MME 130 constructs a context for the UE 110 and returns an Insert Subscriber Data acknowledgement message to the HSS 170. The default APN can be used for the remainder of this procedure.

At event 461, the HSS 170 acknowledges the Update Location message by sending an Update Location Acknowledgement message to the new MME 130. If the Update Location is rejected by the HSS 170, the new MME 130 rejects the Attach Request from the UE 110 with an appropriate cause.

At event 462, if the PDN subscription context contains no PDN gateway address, the new MME 130 selects a PDN gateway. If the PDN subscription profile contains a PDN gateway address and the Attach Type does not indicate "Handover", the new MME 130 may select a new PDN gateway, for example to allocate a PDN gateway that allows for more efficient routing. The new MME 130 selects a serving gateway and allocates a bearer identity for the default bearer associated with the UE 110. The new MME 130 then sends a Create Default Bearer Request message to the selected serving gateway 140. The AMBR that applies to the relevant PDN access might be provided in this message.

At event 463, the serving gateway 140 sends a Create Default Bearer Request message to the PDN gateway 150. After this step, the serving gateway 140 buffers any downlink packets it may receive from the PDN gateway 150 until the serving gateway 140 receives the message in event 471 below. At event 464, if dynamic PCC is deployed, the PDN gateway 150 interacts with the PCRF 180 to obtain the default PCC rules for the UE 110. This may lead to the establishment of a number of dedicated bearers. If dynamic PCC is not deployed, the PDN gateway 150 may apply local QoS policy. If a dynamic AMBR is employed as described herein, the AMBR may be dynamically updated at this point in the manner described above.

At event 465, the PDN gateway 150 returns a Create Default Bearer Response message to the serving gateway 140. If a dynamically adjustable AMBR has been modified by the PDN gateway 150 or the PCRF 180, the adjusted AMBR can be included in the Create Default Bearer Response message. At event 466, the serving gateway 140 returns a Create Default Bearer Response message to the new MME 130. The adjusted AMBR can be included. At event 467, the new MME 130 sends an Attach Accept message to the ENB 120. If the new MME 130 has received an adjusted AMBR from the serving gateway 140, the adjusted AMBR overrides the AMBR retrieved from the HSS 170 in the Attach Accept message.

At event 468, the ENB 120 sends a Radio Bearer Establishment Request to the UE 110, and the Attach Accept message is sent along to the UE 110. At this point, the ENB 120 may change the AMBR value that it received according the procedures described above. At event 469, the UE 110 sends a Radio Bearer Establishment Response message to the ENB 120. An Attach Complete message can be included in this message. At event 470, the ENB 120 forwards an Attach Complete message to the new MME 130. At event 471, the new MME 130 sends an Update Bearer Request message to the serving gateway 140. At event 472, the serving gateway 140 acknowledges by sending an Update Bearer Response message to the new MME 130. The serving gateway 140 can then send its buffered downlink packets.

At event 473, after the new MME 130 receives the Update Bearer Response message, the new MME 130 might send an Update Location Request message to the HSS 170. At event 474, the HSS 170 sends an Update Location Response message to the new MME 130.

The embodiments described herein provide a dynamic AMBR mechanism for long term evolution/system architecture evolvement (LTE/SAE) non-guaranteed bit rate traffic that can optimize radio bearer and core bearer resource utilization with respect to QoS enforcement. The dynamic AMBR can be initialized with the traditional static AMBR and then, based on average bandwidth utilization and a threshold trigger, can be adjusted/updated dynamically by an ENB and by a PDN gateway (or by a PCRF when dynamic PCC is deployed). When bandwidth is available, the dynamic AMBR can provide users with additional bandwidth on non-guaranteed bit rate bearers and possibly reduce the need/cost for the users to pay for guaranteed bit rate bearers. Additionally, dynamic AMBR can provide more efficient utilization of network resources.

Figure 5:
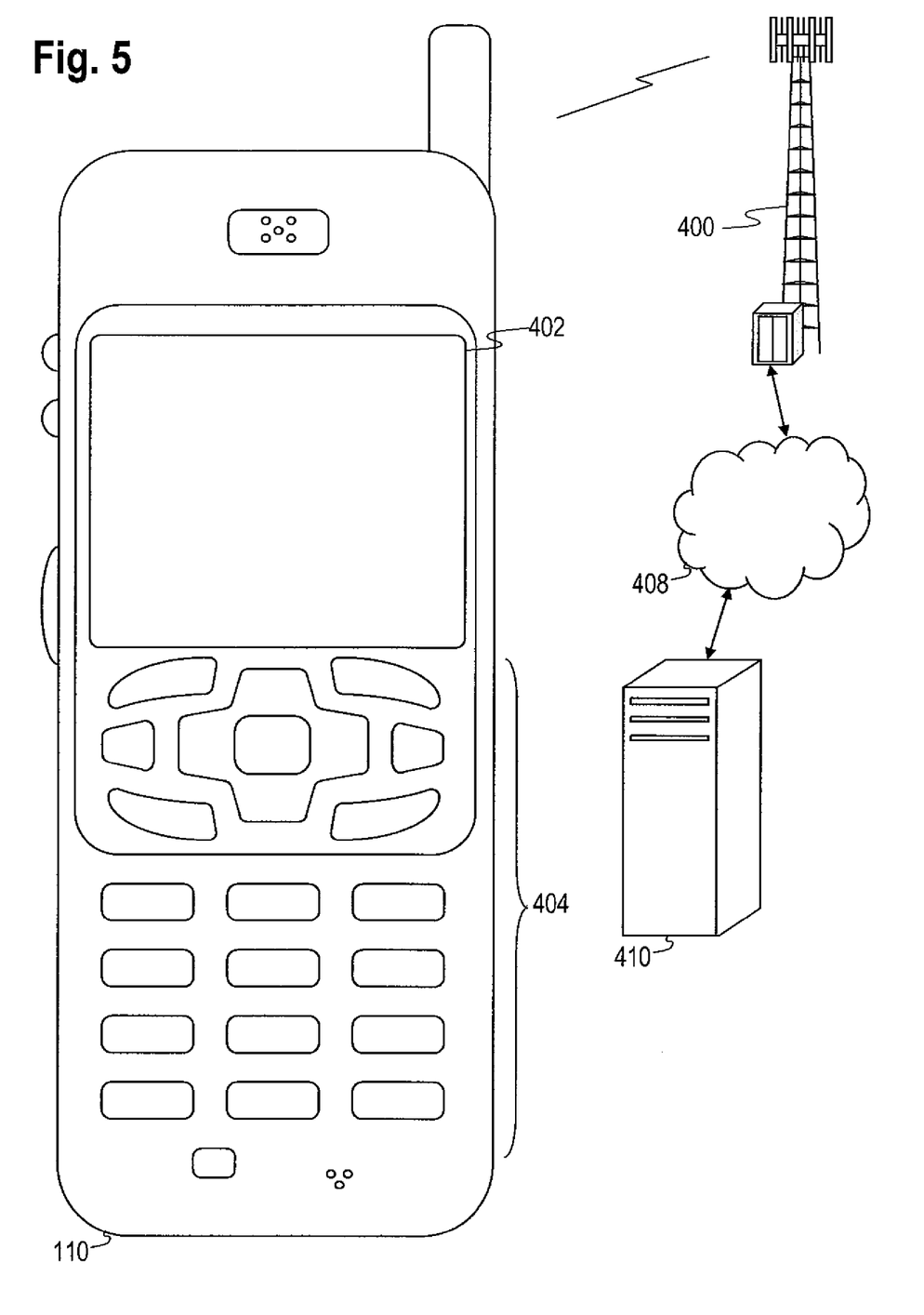
FIG. 5 is a diagram of a wireless communications system including user equipment operable for some of the various embodiments of the disclosure.

FIG. 5 illustrates a wireless communications system including an embodiment of the UE 110. The UE 110 is operable for implementing aspects of the disclosure, but the disclosure should not be limited to these implementations. Though illustrated as a mobile phone, the UE 110 may take various forms including a wireless handset, a pager, a personal digital assistant (PDA), a portable computer, a tablet computer, or a laptop computer. Many suitable devices combine some or all of these functions. In some embodiments of the disclosure, the UE 110 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 110 may be a portable, laptop or other computing device. The UE 110 may support specialized activities such as gaming, inventory control, job control, and/or task management functions, and so on.

The UE 110 includes a display 402. The UE 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 110 may present options for the user to select, controls for the user to actuate, and/or cursors or other indicators for the user to direct.

The UE 110 may further accept data entry from the user, including numbers to dial or various parameter values for configuring the operation of the UE 110. The UE 110 may further execute one or more software or firmware applications in response to user commands. These applications may configure the UE 110 to perform various customized functions in response to user interaction. Additionally, the UE 110 may be programmed and/or configured over-the-air, for example from a wireless base station, a wireless access point, or a peer UE 110.

Among the various applications executable by the UE 110 are a web browser, which enables the display 402 to show a web page. The web page may be obtained via wireless communications with a wireless network access node, a cell tower, a peer UE 110, or any other wireless communication network or system 400. The network 400 is coupled to a wired network 408, such as the Internet. Via the wireless link and the wired network, the UE 110 has access to information on various servers, such as a server 410. The server 410 may provide content that may be shown on the display 402. Alternately, the UE 110 may access the network 400 through a peer UE 110 acting as an intermediary, in a relay type or hop type of connection.

Figure 6:
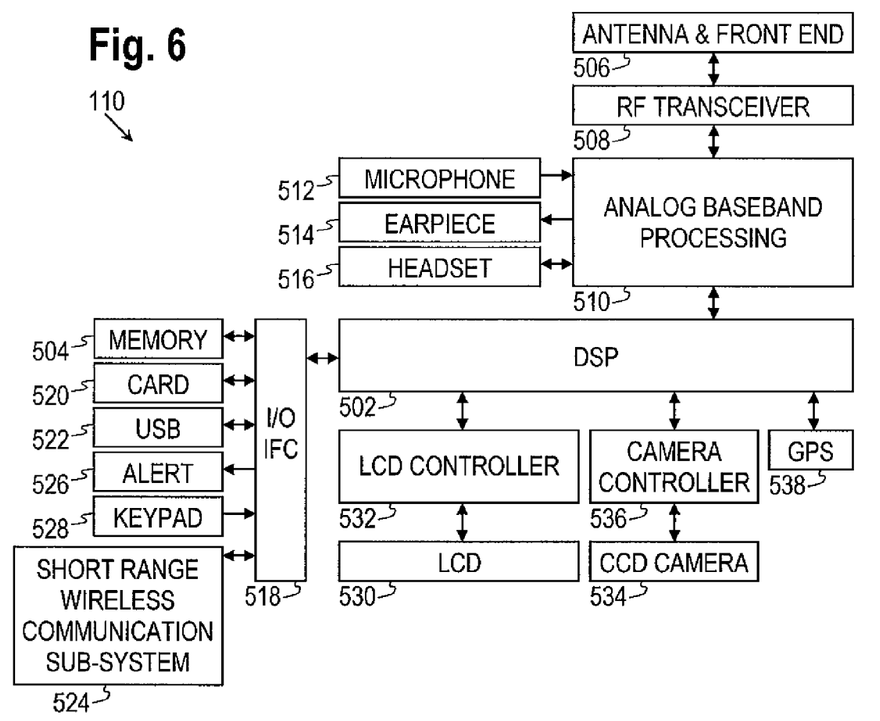
FIG. 6 is a block diagram of user equipment operable for some of the various embodiments of the disclosure.

FIG. 6 shows a block diagram of the UE 110. While a variety of known components of UEs 110 are depicted, in an embodiment a subset of the listed components and/or additional components not listed may be included in the UE 110. The UE 110 includes a digital signal processor (DSP) 502 and a memory 504. As shown, the UE 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 110 to send and receive information from a cellular network or some other available wireless communications network or from a peer UE 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 110 and may also enable the UE 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 110 to communicate wirelessly with other nearby mobile devices and/or wireless base stations.

The input/output interface 518 may further connect the DSP 502 to the alert 526 that, when triggered, causes the UE 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 110 to determine its position. Various other peripherals may also be included to provide additional functions, e.g., radio and television reception.

Figure 7:
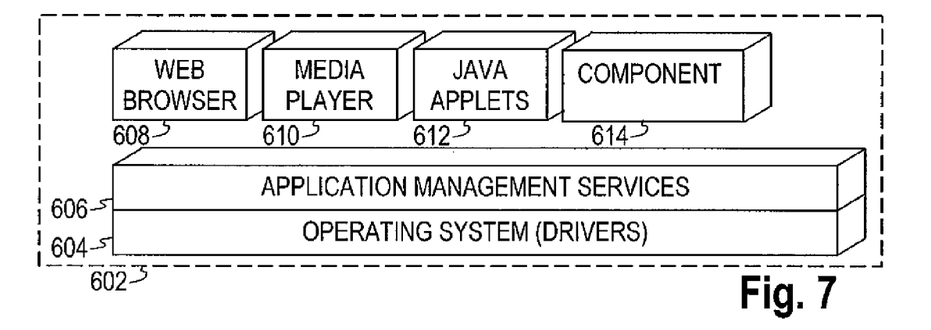
FIG. 7 is a diagram of a software environment that may be implemented on user equipment operable for some of the various embodiments of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the UE hardware with standardized interfaces that are accessible to application software. The operating system drivers 604 include application management services ("AMS") 606 that transfer control between applications running on the UE 110. Also shown in FIG. 7 are a web browser application 608, a media player application 610, and Java applets 612. The web browser application 608 configures the UE 110 to operate as a web browser, allowing a user to enter information into forms and select links to retrieve and view web pages. The media player application 610 configures the UE 110 to retrieve and play audio or audiovisual media. The Java applets 612 configure the UE 110 to provide games, utilities, and other functionality. A component 614 might provide functionality related to a dynamic AMBR.

Figure 8:
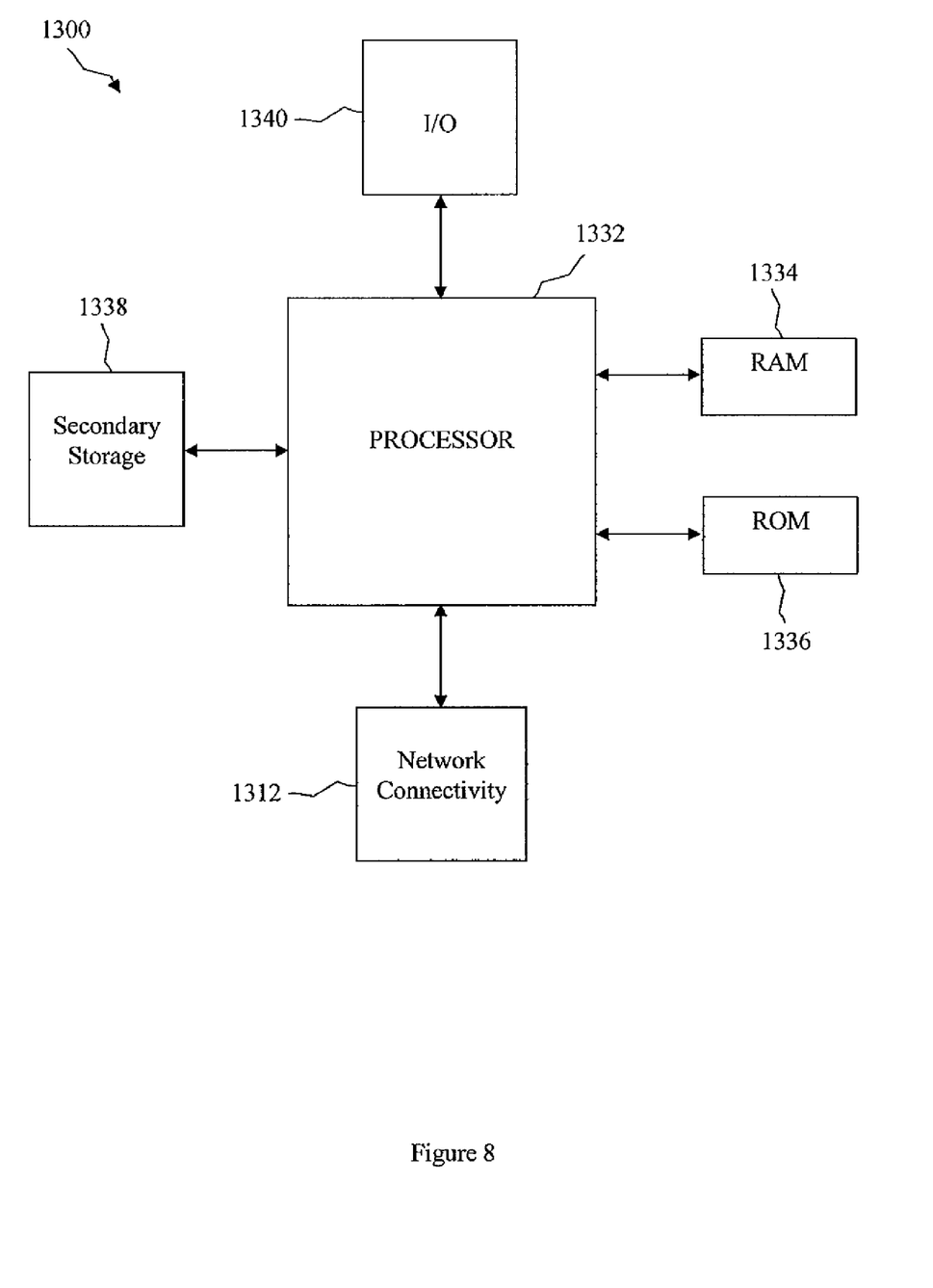
FIG. 8 is an illustrative general purpose computer system suitable for some of the various embodiments of the disclosure.

The components of FIG. 1 may include any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs which are loaded into RAM 1334 when such programs are selected for execution. The ROM 1336 is used to store instructions and perhaps data which are read during program execution. ROM 1336 is a non-volatile memory device which typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with an Internet or one or more intranets. With such a network connection, it is contemplated that the processor 1332 might receive information from the network, or might output information to the network in the course of performing the above-described method steps. The network connectivity devices 1312 may also include one or more transmitter and receivers for wirelessly or otherwise transmitting and receiving signal as are well know to one of ordinary skill in the art.

Such information, which may include data or instructions to be executed using the processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, scripts which it accesses from hard disk, floppy disk, optical disk (these various disk based systems may all be considered secondary storage 1338), ROM 1336, RAM 1334, or the network connectivity devices 1312. While only one processor 1332 is shown, multiple processors may be present. Thus, while instructions may be discussed as executed by a processor, the instructions may be executed simultaneously, serially, or otherwise executed by one or multiple processors.

The following are incorporated herein by reference for all purposes: $3^{rd}$ Generation Partnership Project (3GPP) Technical Specification (TS) 23.401

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for dynamically adjusting an aggregated maximum bit rate 'AMBR', comprising:
   determining whether a change in an AMBR currently applicable to a first network component should be requested; and
   when a change in the AMBR is requested, the first network component recommending to a second network component a recommended adjusted AMBR;
   when a first bandwidth consumed by the first network component differs from a second bandwidth specified in the AMBR currently applicable to the first network component, the first network component recommending to the second network component the recommended adjusted AMBR;
   when the recommended adjusted AMBR is less than an AMBR currently applicable to the second network component, setting the first network component's AMBR and the second network component's AMBR to the recommended adjusted AMBR, and the first network component and the second network component using the recommended adjusted AMBR;
   when the recommended adjusted AMBR is greater than the AMBR currently applicable to the second network component and where the second network component has bandwidth available to support the recommended adjusted AMBR, setting the first network component's AMBR and the second network component's AMBR to the recommended adjusted AMBR, and the first network component and the second network component using the recommended adjusted AMBR; and
   when the recommended adjusted AMBR is greater than the AMBR currently applicable to the second network component and where the second network component's bandwidth can not support the recommended adjusted AMBR, the first network component and the second network component negotiate a new adjusted AMBR, setting the first network component's AMBR and the second network component's AMBR to the negotiated new adjusted AMBR, and the first network component and the second network component using the negotiated new adjusted AMBR, and
   wherein an AMBR defined for a UE is the lesser of a subscribed AMBR, or the available bandwidth of the second network component.

2. The method of claim 1, wherein the first network component recommends the recommended adjusted AMBR when the first bandwidth utilized by the first network component exceeds a threshold related to the AMBR currently applicable to the first network component.

3. The method of claim 1, wherein the first network component recommends the recommended adjusted AMBR when the first bandwidth fails to meet a threshold related to the AMBR currently applicable to the first network component.

4. The method of claim 1, wherein the first network component and the second network component are each selected from the group consisting of:
   an enhanced node B;
   a packet data network gateway;
   a mobility management entity; and
   a policy control and charging rules function.

5. The method of claim 1, wherein the AMBR is adjusted according to one of periodic intervals, real-time bandwidth usage upon bearer establishment, or upon bearer deletion.

6. The method of claim 1, wherein the second network component adjusts the AMBR currently applicable to the second network component, wherein adjusting comprises adjusting upwardly to a level substantially equal to, but not greater than, the recommended adjusted AMBR.

7. The method of claim 1, further comprising:
   initializing the AMBR with a user equipment (UE) subscribed static AMBR.

8. The method of claim 1, further comprising:
   real-time updating the AMBR to form an updated AMBR; and
   sending the updated AMBR between the first network component and a second network component for non-guaranteed bit rate enforcement, and wherein both of the first network component and the second network component are one of a packet data network component, a mobility management entity, or a policy control and charging rules function component, and wherein the second network component is an enhanced node B.

9. The method of claim 1 wherein one of the first and second network components comprises a user equipment (UE).

10. A system for specifying a dynamic aggregated maximum bit rate (AMBR), comprising:
    a processor configured to determine whether a change in an AMBR currently applicable to a first network component should be requested;
    wherein if a change in the AMBR is requested, the processor configured to promote the first network component recommending to a second network component a recommended adjusted AMBR; and
    wherein the first network component is configured to observe a first bandwidth consumed by the first network component and is further configured, when the first bandwidth differs from a second bandwidth specified in the AMBR currently applicable to the first network component, to recommend to the second network component the recommended adjusted AMBR, the first network component and the second network component being configured to set and use the recommended adjusted AMBR when the recommended adjusted AMBR is less than an AMBR currently applicable to the second network component or the recommended adjusted AMBR is greater than an AMBR currently applicable to the second network component and the second component has available bandwidth to support the recommended adjusted AMBR, the first network component and the second network component being further configured to negotiate, set, and use a new adjusted AMBR when the recommended adjusted AMBR is greater than the AMBR currently applicable to the second network component and the second component's available bandwidth can not support the recommended adjusted AMBR.

11. The system of claim 10, wherein the second network component is further configured to adjust its currently applicable AMBR upwardly to form an upwardly adjusted AMBR, and wherein the second network component is further configured to inform the first network component of the upwardly adjusted AMBR, and wherein the first network component is further configured to use the upwardly adjusted AMBR.

12. The system of claim 10, wherein the first network component is further configured to recommend the recommended adjusted AMBR when the first bandwidth utilized by the first network component exceeds a threshold related to the AMBR currently applicable to the first network component.

13. The system of claim 10, wherein the first network component is further configured to recommend the adjusted AMBR when the first bandwidth utilized by the first network component fails to exceed a threshold related to the AMBR currently applicable to the first network component.

14. The system of claim 10 wherein the first network component and the second network component are each of:
   an enhanced node B;
   a packet data network gateway;
   a mobility management entity; and
   a policy control and charging rules function.

15. The system of claim 10 wherein the processor, the first network component, and the second network component are further configured to adjust the AMBR according to one of at periodic intervals, real-time bandwidth usage upon bearer establishment, or upon bearer deletion.

16. The system of claim 11, wherein the second network component is further configured to adjust its currently applicable AMBR upwardly to a level substantially equal to, but not greater than, the recommended adjusted AMBR.

17. The system of claim 10 wherein one of the first and second network components comprises a user equipment (UE).

18. A method for dynamically adjusting an aggregated maximum bit rate (AMBR), comprising:
   determining whether there is a change in the AMBR currently used by a first network component, the determination based on the real time bandwidth usage of one or more non-guaranteed bit rate bearers; and
   when there is a change in the AMBR currently used by the first network component, the first network component recommending to a second network component a recommended adjusted AMBR, wherein the recommended adjusted AMBR is less than or equal to an AMBR applicable to a user equipment (UE), when the second network component does not have bandwidth available to support the recommended adjusted AMBR, the first network component and the second network component negotiating a new adjusted AMBR, and setting the first network component's AMBR and the second network component's AMBR to the negotiated new adjusted AMBR.

19. The method of claim 18, wherein the negotiated new adjusted AMBR is less than or equal to an AMBR applicable to the UE.

* * * * *